United States Patent Office 3,090,799
Patented May 21, 1963

3,090,799
PENTAERYTHRITOL ESTERS OF PHOSPHORIC ACIDS AND COMPOSITIONS CONTAINING THE SAME
Ottmar Wahl, Baden-Baden, and Herbert Grabhöfer, Cologne-Flittard, Germany, assignors to Agfa Aktiengesellschaft, Leverkusen, Germany, a corporation of Germany
No Drawing. Filed Nov. 15, 1960, Ser. No. 69,289
Claims priority, application Germany Nov. 17, 1959
9 Claims. (Cl. 260—461)

This invention relates to plasticizers and processes for the production of plastic compositions using such plasticizers.

Numerous compounds are already known which are suitable for use as plasticizers for synthetic resins. Esters of phosphoric acid with phenols and alcohols, for example, the esters of phosphoric acid with phenol, cresol, butanol, isobutanol, hexanol and octanol, have more especially become of industrial importance as plasticizers. Because of their good solubility properties and their compatibility with a large number of organic compounds of high molecular weight, they are used in the manufacture of foils, fibre and lacquer materials, plastic compositions and moulding materials consisting of cellulose ethers and cellulose esters of polyvinyl compounds, such as polyvinyl chloride, polyvinyl acetate, polyvinyl styrene, of chlorinated rubber, alkyd resins and other polymers and copolymers. Apart from improving the mechanical properties of these materials, the phosphoric acid esters also cause a reduction in the combustibility of the materials treated therewith.

These phosphoric acid esters may nevertheless have an unfavourable effect because of their high migration speed and their volatility.

Consequently the use of those phosphoric acid esters which are physiologically objectionable is prohibited in many cases. In addition, the plasticizers can migrate from the high molecular weight polymers, especially at high temperatures, and cause trouble on the surface of the materials plasticized therewith or in their vicinity.

It has now been found that these disadvantages can be avoided by using, as plasticizers, phosphoric acid esters of the general formula $$R_1O-P\begin{matrix}O\\\parallel\end{matrix}\begin{matrix}O-CH_2\\\diagdown\\O-CH_2\end{matrix}C\begin{matrix}CH_2-O\\\diagup\\CH_2-O\end{matrix}\begin{matrix}O\\\parallel\end{matrix}P-OR_2$$

in which $R_1$ and $R_2$ represent aliphatic, cycloaliphatic, heterocyclic or aromatic radicals, the hydrogen atoms of which can be substituted, for example, by halogen, ester, keto, nitrile or amino groups. $R_1$ and $R_2$ can be identical or different. The aforementioned substituents are so selected that they do not impair the solubility and the compatibility of the plasticizer.

The said compounds have good solubility in numerous organic solvents and in compounds of high molecular weight. They all have very high boiling points and a very low volatility. The melting points depend on the nature of the substituents $R_1$ and $R_2$. The aliphatically substituted compounds have particularly low melting points and many of them are wax-like substances. The thermal stability of the compounds is excellent. In accordance with this high stability, the low migration speed and the low volatility, materials plasticized with these phosphoric acid esters can be subjected to higher temperatures than products processed with known phosphoric acid esters.

Because of their relatively high phosphoric acid content, there is a greater reduction in the combustibility for the same addition of plasticizer; in other words, smaller additions are sufficient for producing the same effect, and this is particularly advantageous when using plasticizer mixtures.

The incorporation of these plasticizers into substances of high molecular weight can be effected by conventional methods. For example the plasticizer can be stirred in a solution of the synthetic resin or rolled in the said resin.

These plasticizers may be produced in accordance with various processes, several of which are set out below by way of example:

(a) Pentaerythritol is heated in an inert solvent with phosphorus oxychloride and phenols or alcohols, with the accompanying formation of hydrogen chloride.

(b) Pentaerythritol is heated with phosphoric acid esters of simple phenols or alcohols, preferably in vacuo, a transesterification to the compounds of higher heat stability according to the invention taking place with phenol or alcohol being split off.

(c) A particularly suitable method consists in heating pentaerythritol in excess phosphorus oxychloride. The pentaerythritol dissolves forming the pentaerythritol ester of phosphorochloridic acid, which precipitates from the solution. The pentaerythritol ester of phosphorochloridic acid, the preparation of which was described by R. Charonnat, J. V. Harispe, M. Harispe, O. Efimovsky and L. Chevillard in Ann. pharm. franç. vol. 10, pages 666 to 669 (1952), has the following formula:

$$Cl-P\begin{matrix}O\\\parallel\end{matrix}\begin{matrix}O-CH_2\\\diagdown\\O-CH_2\end{matrix}C\begin{matrix}CH_2-O\\\diagup\\CH_2-O\end{matrix}\begin{matrix}O\\\parallel\end{matrix}P-Cl$$

The foregoing pentaerythritol ester of phosphorochloridic acid can be reacted with phenols or alcohols, with hydrogen chloride being split off. Both symmetrical and asymmetrical esters can be prepared in this simple manner industrially.

The plasticizers of the present invention can be used in the production of shaped plastic compositions, such as foils, fibre and lacquer materials, as well as moulding materials, from organic compounds of high molecular weight, such as cellulose esters, cellulose ethers, polyvinyl compounds, for example, polyvinyl chloride, polyvinyl acetate, polystyrene, chlorinated rubber, alkyl resins, polyesters, polymers of acrylic acid and derivatives thereof, polyethylene, polypropylene and other polymers and copolymers.

The combinations of plasticizers may be used for the obtaining of the best possible results in the plasticized materials.

EXAMPLE 1

136 grams of pentaerythritol are introduced into 500 cc. of phosphorus oxychloride and heated on a steam bath. The pentaerythritol is completely dissolved over a period of 30–45 minutes, with evolution of hydrogen chloride, the pentaerythritol ester of phosphorochloridic acid represented by the formula hereinbefore crystallizing out as colorless crystals. After the major part of the phosphorus oxychloride has been evaporated in vacuo, the crystals are preferably suction-filtered and washed with methylene chloride. Yield: about 250 g., M.P.: 243–245° C.

300 grams of the pentaerythritol ester of phosphorochloridic acid and 220 g. of phenol are heated under reflux to boiling point in 2 liters of methylene chloride, after adding 300 cc. of triethylamine.

After the methylene chloride has been distilled off, the residue is extracted by shaking with a mixture of water and methylene chloride, the triethylamine in salt form entering the aqueous phase and the phosphoric acid ester of pentaerythritol represented by Formula I in the table hereinafter dissolving in the methylene chloride phase. After separation of the methylene chloride phase. After separation represented by the methylene chloride solution and after evaporation of the solvent, the ester of Formula I remains. Yield: about 300 g., M.P. 201–202° C.

*Production of a Cellulose Triacetate Film*

A solution of 50 g. of cellulose triacetate in 6 g. of isopropanol and 300 g. of methylene chloride are mixed with 10 g. of the ester represented by Formula I dissolved in 50 g. of methylene chloride. The casting solution is freed from air bubbles by heating, it is then cooled and cast on to a support, and stripped off after drying. A crystal clear cellulose acetate film is formed, which can be used as a support for photographic films.

The production of a polystyrene film is effected in a manner analogous to the cellulose triacetate film with a casting solution containing 5 g. of the ester represented by Formula I and 50 g. of polystyrene in 350 cc. of methylene chloride.

EXAMPLE 2

300 grams of the pentaerythritol ester of phosphorochloridic acid and 230 g. of p-cresol are suspended in 2 liters of methylene chloride and, after addition of 300 cc. of triethylamine, are heated for 5 hours to boiling point. After evaporating off the methylene chloride, the residue is stirred with water, suction-filtered and recrystallized from alcohol. The ester so produced is represented hereinafter by the Formula II. Yield: 380 g. M.P. 213° C.

A solution of 50 g. of cellulose triacetate, 6 g. of isopropanol, 350 g. of methylene chloride and 5 g. of a mixture of the ester represented by Formula II, prepared as described hereinbefore, and tricresyl phosphate in a proportion by weight of 2:1, is cast on a glass plate. After evaporation of the solvent, the film is stripped off the glass plate, dried for two hours in a drying chamber at 80° C. and thereafter freely suspended for 2 days at room temperature. A clear, flexible foil is obtained which is suitable as a support for photographic films.

EXAMPLE 3

300 cubic centimeters of triethylamine are added in portions to 300 g. of the pentaerythritol ester of phosphorochloridic acid and 200 cc. of absolute alcohol in 2 liters of methylene chloride and the mixture is heated for 6 hours on a steam bath to boiling point. After evaporating the solvent, the residue is washed with water and the ester which forms, which is represented by the Formula III hereinafter is recrystallized from alcohol. Colorless crystals having a melting point of 149° C. are obtained; yield: about 250 g.

A solution of 50 g. of cellulose triacetate, 6 g. of isopropanol, 350 g. of methylene chloride and 10 g. of the plasticizer (Formula III) prepared as described hereinbefore is drawn out by means of a film-casting box on a glass plate, so that a dry film with a thickness of about 140 microns is formed. After drying, the film is stripped off and freed from the solvent residues by heating for 2 hours at 80° C. in a drying chamber.

EXAMPLE 4

300 cubic centimeters of triethylamine are mixed in portions with 300 g. of the pentaerythritol ester of phosphorochloridic acid and 380 g. of lauric alcohol in 2 liters of methylene chloride and the mixture is heated for 12 hours on a steam bath to boiling point. After separating out the triethyl ammonium chloride which forms, the mixture is concentrated by evaporation. The residue is washed with water and the ester which forms, which is represented by Formula IV hereinafter, is recrystallized from ethanol. A wax-like mass is obtained: yield 340 g.

A cellulose triacetate film is produced in a manner analogous to Example 3 with a casting solution containing 5 g. of the ester represented by Formula IV, 50 g. of cellulose triacetate in 350 cc. of methylene chloride and 6 g. of isopropanol.

EXAMPLE 5

300 cubic centimeters of triethylamine are added in portions to 300 g. of the pentaerythritol ester of phosphorochloridic acid and 200 g. of monoethyl ester of glycol (2-ethoxyethanol) in 2 liters of methylene chloride and the mixture is heated for 12 hours on a steam bath to boiling point. After evaporating off the solvent, the residue is extracted by shaking with ethylene chloride (ratio 1:1). The aqueous phase is separated and the triethylamine contained therein is recovered; the ethylene chloride extract is completely concentrated by evaporation. It is then subjected to further evaporation under reduced pressure for 2 hours at 0.1 mm. and 95° C. The product is a thick viscous oil represented by Formula V, hereinafter which cannot be distilled. Yield: 386 g.

*Production of a Cellulose Triacetate Film*

15 grams of the foregoing product (Formula V) are added to a solution of 350 g. of methylene chloride, 6 g. of isopropanol and 50 g. cellulose triacetate.

This casting solution is poured on to a glass plate and stripped off after drying. A crystal-clear, flexible film is formed which has good mechanical properties.

The production of a polycarbonate film is effected in a manner analogous to the cellulose triacetate film with a casting solution containing 8 g. of the product represented by Formula V and 40 g. of the polycarbonate of bisphenol A [2,2-bis(4-hydroxyphenyl)propane] in 350 ml. of methylene chloride.

EXAMPLE 6

300 grams of the pentaerythritol ester of phosphorochloridic acid, 310 g. of β-cyanethylglycol and 300 cc. of triethylamine are treated in 2 liters of methylene chloride as described in Example 5 hereinbefore. The product is a viscous oil whose composition is represented by Formula VI hereinafter, which cannot be distilled. Yield: 496 g.

The plasticizer prepared as described above when used in quantities from 5 to 40% imparts excellent toughness, flexibility and extensibility to cellulose triacetate film and does not show any exudation at relatively high temperatures.

EXAMPLE 7

300 grams of the pentaerythritol ester of phosphorochloridic acid, 350 g. of p-hydroxybenzoic acid ethyl ester and 300 cc. of triethylamine in 2 liters of methylene chloride are treated in a manner analogous to that described in Example 3, the ester which forms, which is represented by the Formula VII hereinafter, is obtained from alcohol in the form of colorless crystals having a melting point of 212° C. Yield: 290 g.

*Production of a Cellulose Triacetate Film*

In order to make a film, 5 g. of the ester represented by Formula VII are dissolved in 50 g. of methylene chloride and stirred into a solution of 50 g. of cellulose triacetate, 300 g. of methylene chloride and 6 g. of isopropanol. This casting solution is placed for 5 minutes in water at a temperature of 90° C. in an open vessel until the mixture is copiously permeated with bubbles. The vessel is then closed and cooled in iced water. The casting solution deaerated in this manner is drawn by means of a film-casting box on a glass plate at a speed of about 2 cm./sec. The casting slot is so set that a dry film with a thickness of about 100 microns is formed. Immediately after casting, the glass plate is blown with hot air that is circulated by a fan. After about 30 minutes, the film is stripped from the support and thereafter heated for 2 hours in a drying chamber to 80° C. A crystal-clear cellulose acetate film with good mechanical properties is formed, and this film can be used as a support for photographic films.

*Production of a Plasticized Polyvinyl Chloride*

30 parts by weight of the ester plasticizer represented by Formula VII are worked into 70 parts of polyvinyl chloride by means of mixing rollers that are heated to 160° C. The homogeneous mixture is stripped off and used for the production of molded articles.

EXAMPLE 8

11.2 grams of triethylamine was added portionwise at room temperature to a suspension of 15 g. of the pentaerythritol ester of phosphorochloridic acid and 14.1 g. of p-chloro-phenol in 250 ml. of methylene chloride. After being refluxed for 2 hours a clear solution is obtained. This solution is extracted by shaking with an equal volume of water, the triethylamine in salt form entering the aqueous phase. The organic phase is dried with sodium sulfate, the methylene chloride is distilled off and the residue recrystallized from ethanol. 7 grams of the ester represented by Formula VIII hereinafter is obtained. The product has a melting point of 221–222° C.

A cellulose triacetate film is produced in a manner analogous to that described in Example 1 with a casting solution containing 5 g. of the foregoing ester (Formula VIII), 50 g. of cellulose triacetate in 350 cc. of methylene chloride and 6 g. of isopropanol.

It will be clear to those skilled in this art that the practice of the invention lends itself readily to a number of useful modifications in method, apparatus, materials, etc. For example, the plastic substances whose use has been described are not limited to those specified hereinbefore but may comprise any suitable thermoplastic resins. The invention is not to be considered as limited to the specific methods of applying the plasticizers as described in this specification. Furthermore, the plasticizers may be used in combination with other plasticizers according to the invention or with known plasticizers, such as esters of phosphoric acid, phthalic acid, adipic acid, and sebacic acid.

TABLE OF FORMULAE

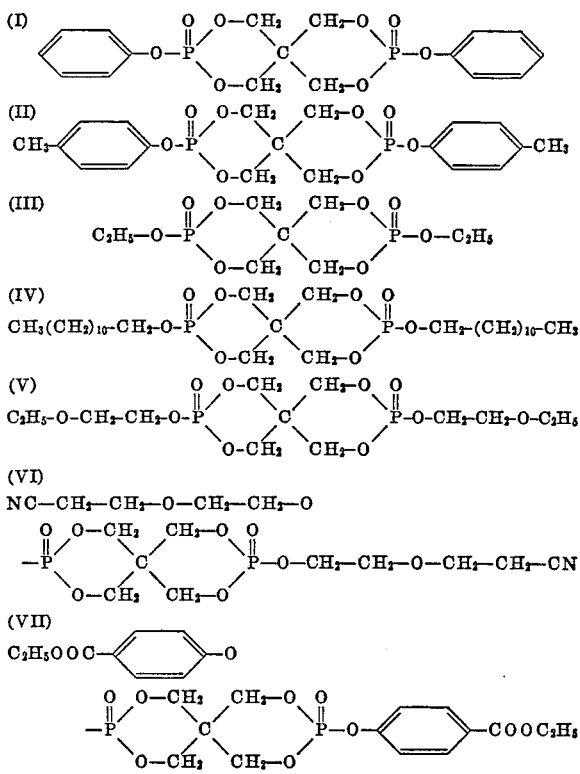

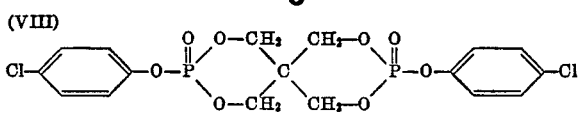

What is claimed is:
1. A compound of the formula

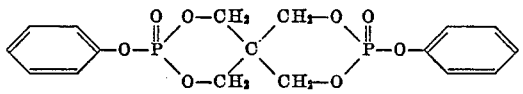

2. A compound of the formula

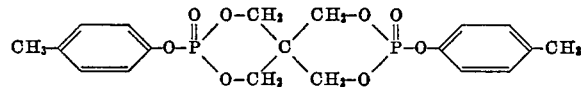

3. A compound of the formula:

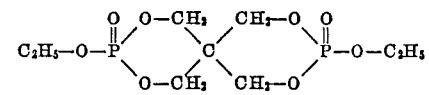

4. A compound of the formula:

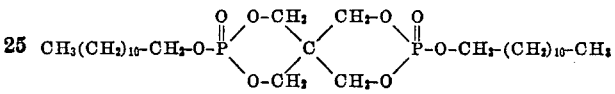

5. A compound of the formula:

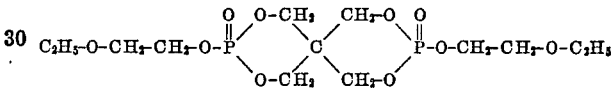

6. A compound of the formula:

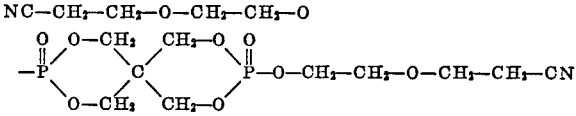

7. A compound of the formula:

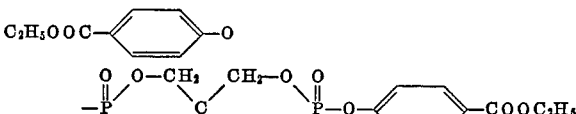

8. A compound of the formula:

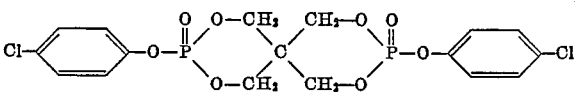

9. A compound of the group consisting of pentaerythritol esters of phosphoric acids having the general formula:

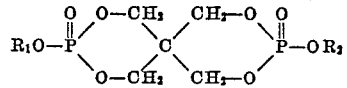

in which $R_1$ and $R_2$ is a radical of the group consisting of alkyl having up to 20 carbon atoms, alkyl having up to 20 carbon atoms and a carbon atoms substituent of the group consisting of alkoxy and cyano radicals, phenyl, and phenyl having a substituent of the group consisting of alkyl, halogen and alkoxycarbonyl radicals.

References Cited in the file of this patent

UNITED STATES PATENTS 2,583,549    Daul et al. _____ Jan. 29, 1952
2,847,443    Hechenbleikner et al. ____ Aug. 12, 1958

OTHER REFERENCES

Kosolapaff: Organo Phosphorus Compounds, pages 198 and 231, 1950 edition, John Wiley and Sons, New York, New York.